United States Patent
Yokonuma (10) Patent No.: US 6,876,393 B1
(45) Date of Patent: Apr. 5, 2005

(54) ELECTRONIC CAMERA WITH BATTERY CAPABILITY CONSIDERATION

(75) Inventor: Norikazu Yokonuma, Chiyoda (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/501,257

(22) Filed: Feb. 9, 2000

(30) Foreign Application Priority Data

Feb. 10, 1999 (JP) .......................... 11-033219

(51) Int. Cl.$^7$ .......................... H04N 5/225; H04N 5/76; H04N 9/04; G03B 7/26
(52) U.S. Cl. ............. 348/372; 348/207.99; 348/231.99; 396/303
(58) Field of Search ............................ 348/207.99, 372, 348/231.99, 231.2, 231.7, 231.9; 396/277, 278, 279, 280, 301, 302, 303, 304

(56) References Cited

U.S. PATENT DOCUMENTS

| | | | | |
|---|---|---|---|---|
| 5,212,556 A | * | 5/1993 | Ogawa | 348/207.99 |
| 5,414,464 A | * | 5/1995 | Sasaki | 348/222.1 |
| 5,717,308 A | * | 2/1998 | Nishitani et al. | 396/279 |
| 5,864,726 A | * | 1/1999 | Yamamoto | 396/429 |
| 5,986,700 A | * | 11/1999 | Wakui | 348/231.8 |
| 6,031,999 A | * | 2/2000 | Ogawa | 396/303 |
| 6,233,016 B1 | * | 5/2001 | Anderson et al. | 348/372 |
| 6,351,287 B1 | * | 2/2002 | Sakaegi et al. | 348/372 |
| 6,522,361 B2 | * | 2/2003 | Higuchi et al. | 348/372 |

* cited by examiner

Primary Examiner—Wendy R. Garber
Assistant Examiner—Justin Misleh
(74) Attorney, Agent, or Firm—Oliff & Berridge PLC (57) ABSTRACT

An electronic camera according to the present invention includes: a recording device that records image data output by an image-capturing element, which captures an image of a subject, into a recording medium; a battery voltage detection device that detects a battery voltage; a check level setting device that sets a battery check level by taking into consideration a quantity of battery power consumption required for recording the image data to the recording medium; and a photographing decision-making device that makes a decision as to whether or not a photographing operation is enabled by comparing the battery voltage value detected by the battery voltage detection device with the check level set by the check level setting device.

20 Claims, 9 Drawing Sheets

ELECTRONIC CAMERA WITH BATTERY CAPABILITY CONSIDERATION

INCORPORATION BY REFERENCE

The disclosure of the following priority application is herein incorporated by reference:
Japanese Patent Application No. 11-33219 filed Feb. 10, 1999

BACKGROUND OF THE INVENTION

1. Field of the Invention

The present invention relates to an electronic camera and in particular, it relates to an electronic still camera achieving a higher degree of reliability in rapid shooting and continuous shooting.

2. Description of the Related Art

In an electronic still camera, image data obtained through image-capturing performed by an image-capturing element such as a CCD are first taken into a buffer memory and stored, and after the image data are compressed, the compressed image data are recorded in a detachable recording medium such as a flash memory.

It takes more time to record image data in a recording medium than is required to store the image data in a buffer memory and the process consumes more battery power. This means that it is necessary to have more battery power available to support a continuous shooting mode, in which a plurality of pictures are taken continuously, than a single-shot mode in which pictures are taken one at a time in order to assure that continuous shooting is not interrupted due to loss of battery power.

In addition, a rapid shooting mode, in which a shutter release is performed before the transfer of compressed image data to the recording medium is completed, consumes more battery power than the single-shot mode, since processing for transferring and recording the compressed image data corresponding to the preceding frame into the recording medium is performed in the rapid shooting mode in addition to processing similar to that performed in the single-shot mode. Thus, unless there is a sufficient quantity of battery power remaining, the battery will run down, to result in an interruption of the rapid shooting operation.

SUMMARY OF THE INVENTION

An object of the present invention is to prevent interruption of photographing operations from occurring due to loss of battery power.

In order to attain the above object, an electronic camera according to the present invention comprises: a recording device that records image data output by an image-capturing element, which captures an image of a subject, into a recording medium; a battery voltage detection device that detects a battery voltage; a check level setting device that sets a battery check level by taking into consideration a quantity of battery power consumption required for recording the image data to the recording medium; and a photographing decision-making device that makes a decision as to whether or not a photographing operation is enabled by comparing the battery voltage value detected by the battery voltage detection device with the check level set by the check level setting device.

Another electronic camera according to the present invention comprises: a compression control device that compresses image data output by an image-capturing element, which captures an image of a subject, at a specific compression rate and records compressed image data into a recording medium; a battery voltage detection device that detects a battery voltage; a check level setting device that sets a battery check level according to the specific compression rate; and a photographing decision-making device that makes a decision as to whether or not a photographing operation is enabled by comparing the battery voltage value detected by the battery voltage detection device with the check level set by the check level setting device.

Another electronic camera according to the present invention comprises: a file generation device that processes image data output by an image-capturing element, which captures an image of a subject, generates a file having a size depending on an image data processing, and records the file thus generated into a recording medium; a battery voltage detection device that detects a battery voltage; a check level setting device that sets a battery check level according to a size of a file generated by the file generation device; and a photographing decision-making device that makes a decision as to whether or not a photographing operation is enabled by comparing the battery voltage value detected by the battery voltage detection device with the check level set by the check level setting device.

Another electronic camera according to the present invention comprises: a recording device that records image data output by an image-capturing element, which captures an image of a subject, into a recording medium; a continuous shooting picture number setting device that sets a number of pictures to be taken in a continuous shooting mode; a battery voltage detection device that detects a battery voltage; a check level setting device that sets a battery check level according to a number of pictures for continuous shooting set by the continuous shooting picture number setting device; and a photographing decision-making device that makes a decision as to whether or not a photographing operation is enabled by comparing the battery voltage value detected by the battery voltage detection device with the check level set by the check level setting device.

In this electronic camera, it is preferred that: the recording device records the image data in the recording medium after compressing the image data at a specific compression rate; and the check level setting device sets the battery check level by taking into consideration the specific compression rate.

It is also preferred that: the recording device processes the image data, generates a file having a size depending on an image data processing and records the file thus generated into the recording medium; the check level setting device sets the battery check level by taking into consideration a size of a file generated by the file generation device.

Another electronic camera according to the present invention comprises: a recording device that records image data output by an image-capturing element, which captures an image of a subject, into a recording medium; a battery voltage detection device that detects a battery voltage; a continuous shooting enabled picture number determining device that determines a number of pictures that can be taken continuously according to the battery voltage detected by the battery voltage detection device; and a continuous shooting picture number limiting device that limits a number of pictures to be taken in a continuous shooting mode to the number of pictures that can be taken continuously.

In this electronic camera, it is preferred that: the recording device records the image data in the recording medium after compressing the image data at a specific compression rate;

and the continuous shooting enabled picture number determining device determines the number of pictures that can be taken continuously by taking into consideration the specific compression rate.

It is also preferred that: the recording device processes the image data, generates a file having a size depending on an image data processing and records the file thus generated into the recording medium; and the continuous shooting enabled picture number determining device determines the number of pictures that can be taken continuously by taking into consideration a size of a file generated by the file generation device.

Another electronic camera according to the present invention comprises: a storage element that is capable of storing image data corresponding to a plurality of frames output by an image-capturing element which captures an image of a subject; a recording device that transfers and records the image data stored at the storage element into a recording medium; a battery voltage detection device that detects a battery voltage; a check level setting device that sets a battery check level according to a volume of image data stored at the storage element which have not been transferred yet; and a photographing decision-making device that makes a decision as to whether or not a photographing operation for a next frame is enabled by comparing the battery voltage value detected by the battery voltage detection device with the check level set by the check level setting device when an instruction to start the photographing operation of the next frame is issued before transfer of the image data from the storage element to the recording medium is completed.

It is preferred that the above electronic cameras having the photographing decision-making device further comprise a warning device that stops a photographing operation for a current frame and issues a warning when the photographing decision-making device decides that the photographing operation is not possible.

DESCRIPTION OF THE PREFERRED EMBODIMENT

Figure 1:
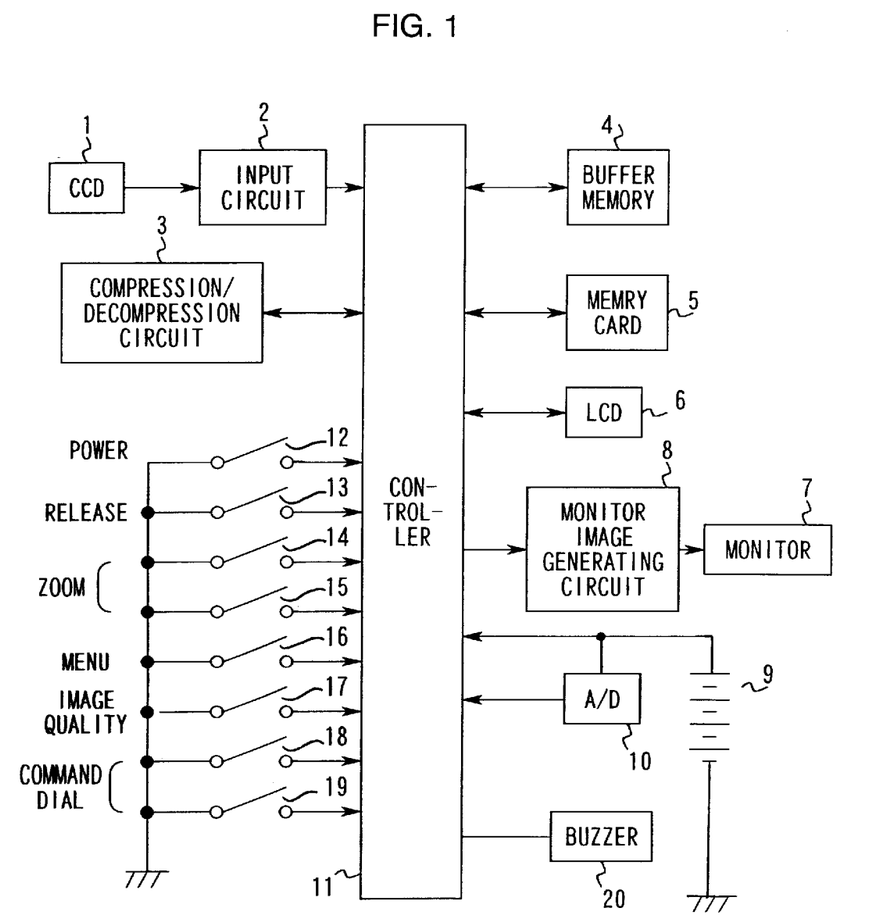
FIG. 1 illustrates the structure adopted in an embodiment.

FIG. 1 shows the structure adopted in an embodiment.

A CCD 1 is an image-capturing element that captures an image of a subject image formed by a photographic optical system (not shown) and outputs an analog signal corresponding to the brightness of the subject image for each pixel. At an input circuit 2, after analog image signals from the CCD 1 undergo processing such as gain adjustment, they are converted to digital signals, undergo image processing such as white balance adjustment, outline interpolation and gamma correction and are then output as original image data. A compression/decompression circuit 3 compresses the original image data at a specific compression rate through JPEG or the like and also decompresses compressed image data to the original image data.

An explanation is given in reference to this embodiment on an example in which there are three different image quality modes, i.e., a fine mode, a normal mode and a basic mode. Table 1 presents the compression rates in the individual image quality modes relative to the original image data volume, data volumes corresponding to one image and the lengths of time required to transfer data from a buffer memory 4 to a memory card 5 which are to be detailed later.

TABLE 1

| | compression rate | data volume | transfer time |
| --- | --- | --- | --- |
| fine mode | approximately 1/4 | approximately 500 Kb | approximately 2 s |
| normal mode | approximately 1/8 | approximately 250 Kb | approximately 1 s |
| basic mode | approximately 1/16 | approximately 125 Kb | approximately 0.5 s |

It is to be noted in this specification that a high or large compression rate means a compression rate having a large denominator of a fraction as shown in Table 1. In other words, the compression rate of the fine mode is smaller than the compression rate of the normal mode in Table 1.

These image quality modes are sequentially selected each time an image quality mode switch 17, to be detailed later, is operated. It is to be noted that the types of individual image quality modes are not limited to those in this embodiment.

The buffer memory 4 temporarily stores original image data obtained through image-capturing and compressed image data having undergone compression, and may be constituted of an SRAM, a DRAM, an SDRAM or the like. The memory card 5, which is a detachable recording medium, may be constituted of flash memory or the like. An LCD 6 is a display panel provided to display information required for photographing, such as the continuous shooting mode, the image quality mode, the remaining battery power and the number of pictures. A monitor 7 is a liquid crystal display for displaying photographed images. When a photographing mode is set, a monitor image generation circuit 8 generates display image data from original image data obtained through image-capturing performed at the CCD 1 and the monitor 7 displays the display image data. When a reproduction mode is set, the compression/decompression circuit 3 decompresses the compressed image data read out from the memory card 5 and the monitor image generation circuit 8 generates display image data from the decompressed data, then the monitor displays the display image data.

Batteries 9 constitute a power source that supplies power to various circuits and devices internally provided at the camera and a specific quantity of a specific type of batteries should be loaded. In the embodiment, four 1.5V AA batteries are loaded. The batteries 9 may be alkaline dry batteries, nickel-cadmium batteries, nickel-hydrogen batteries, lithium dry batteries or the like. The batteries 9 are also connected with an A/D converter which detects a battery voltage vb.

A controller 11, which is constituted of a microcomputer and its peripheral components, executes various arithmetic operations and sequence control for the camera. A power switch 12, a shutter release switch 13, a zoom-in (T) switch 14, a zoom-out (W) switch 15, a menu screen switch 16, the image quality mode switch 17, command dial switches 18 and 19, a buzzer 20 and the like, as well as the input circuit 2, the compression/decompression circuit 3, the buffer memory 4, the memory card 5, the LCD 6, the monitor image generation circuit 8 and the A/D converter 10 mentioned above, are connected to the controller 11.

The zoom switches 14 and 15 are operated to zoom in/out a zoom lens (not shown), and are also used to move the cursor on the menu screen brought up on the monitor 7, to select various modes and to set the number of pictures. If the menu screen switch 16 is operated while the photographing mode is set, a photographing menu that includes exposure correction, photometering method and continuous shooting is displayed at the monitor 7, and a selection is made by moving the cursor through the zoom switches 14 and 15. If the menu screen switch 16 is operated while the reproduction mode is set, on the other hand, a reproduction menu including thumbnail, recorded image deletion, slide-show and the like is displayed at the monitor 7, and a selection is made by moving the cursor through the zoom switches 14 and 15. The command dial switches 18 and 19 are each turned on/off in conformance to a specific angle to which a command dial (not shown) is rotated, with the switch 18 being turned on/off through a clockwise rotation of the command dial and the switch 19 being turned on/off through a counterclockwise rotation of the command dial. The command dial is utilized when setting the number of pictures to be taken in the continuous shooting mode and the exposure value.

When continuous shooting is selected from the photographing menu, a sub-menu that may include single-shot, continuous shooting and fast continuous shooting is displayed at the monitor 7, and one of these is selected by moving the cursor through the zoom switches 14 and 15. If the continuous shooting mode or the fast continuous shooting mode is set, the photographing operation is repeated continuously over the number of pictures for continuous shooting set in advance. It is to be noted that continuous shooting may be achieved by repeating a photographing operation while the shutter release switch 13 remains in an on state instead. In the continuous shooting mode, the subject image data in the selected image quality mode are recorded in a full file size. The full file size in this context refers to the file size of an image constituted of almost all the effective pixel data output by the CCD 1, and the full file size in the embodiment, for instance, is equivalent to a 1,280× 960 pixel data file size. In addition, in the fast continuous shooting mode, the subject image data in the "normal" image quality mode are recorded in a VGA file size (640× 480 pixels). It is to be noted that the VGA file size may be created through the trimming method, in which only the image at the center of the image plane is extracted from the full image or through a method in which image data in the full image are thinned out.

Figure 2:
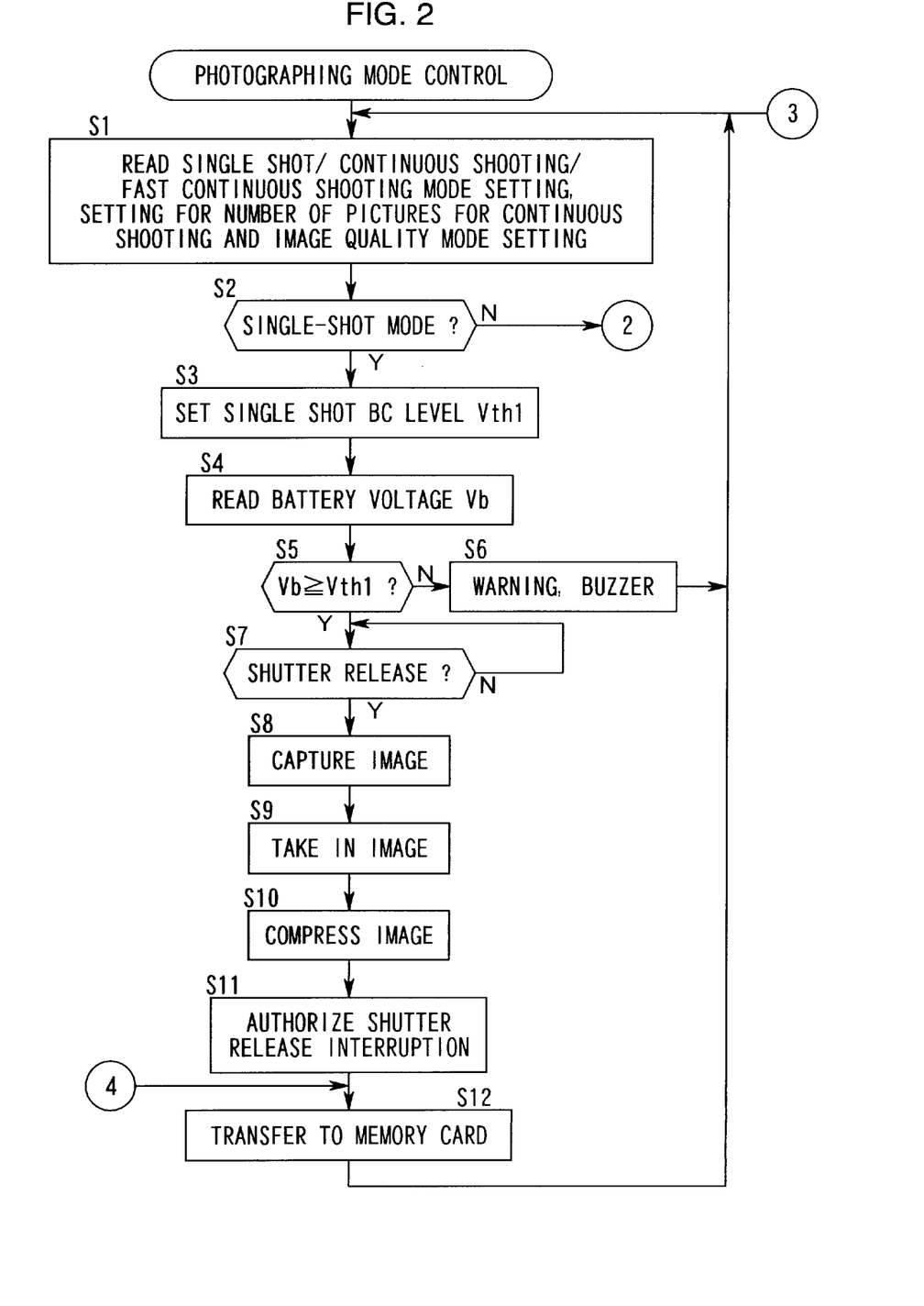
FIG. 2 is a flowchart of the photographing mode control implemented in the embodiment.
Figure 3:
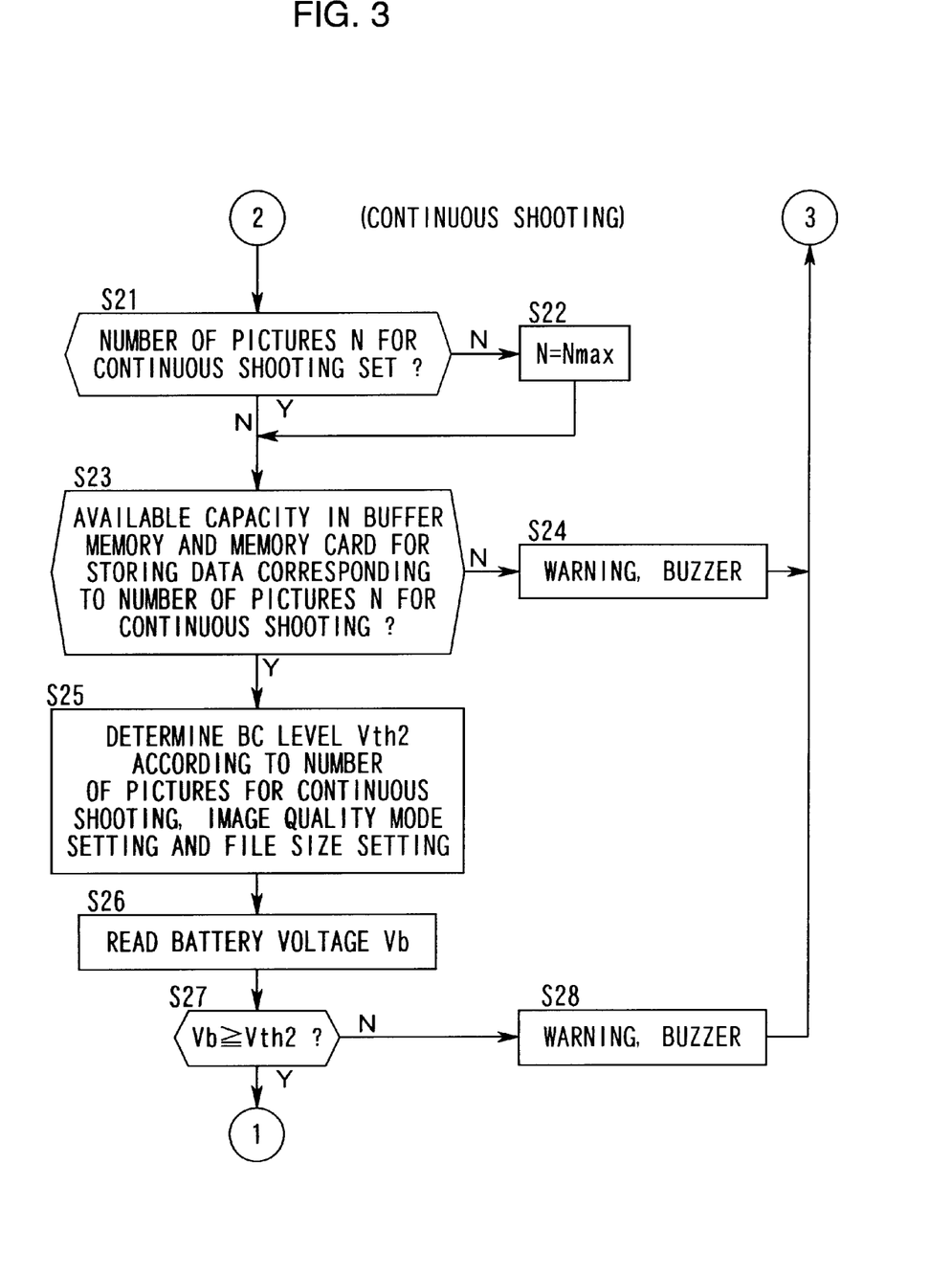
FIG. 3 is a flowchart of the photographing mode control implemented in the embodiment, continuing from FIG. 2.
Figure 4:
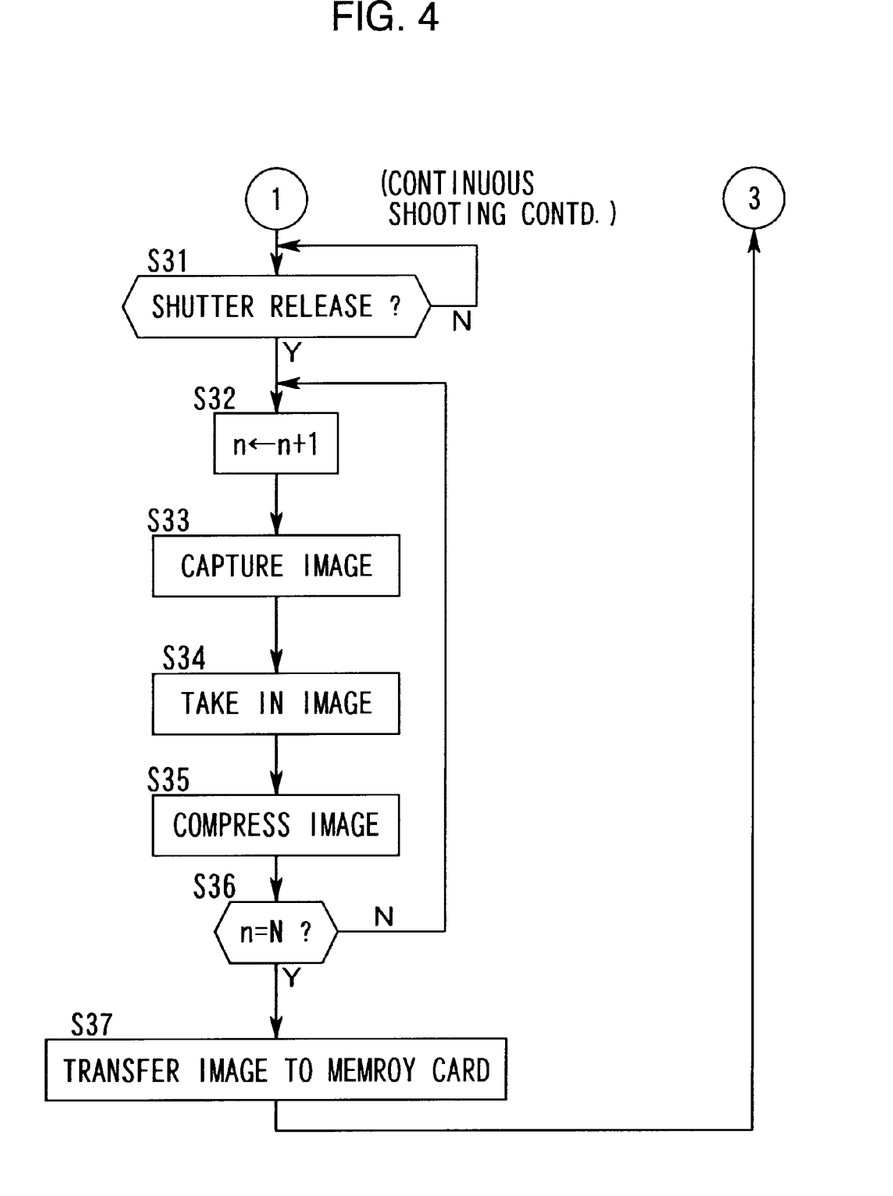
FIG. 4 a flowchart of the photographing mode control implemented in the embodiment, continuing from FIG. 3.

FIGS. 2~4 present a flowchart of the photographing mode control implemented in the embodiment. The operation performed in the embodiment is now explained in reference to the flowchart.

The microcomputer in the controller 11 executes the photographing mode control when the power switch 12 is turned on and the photographing mode is selected. In step S1, the mode setting, i.e., the single-shot mode, the continuous shooting mode or the fast continuous shooting mode, the setting for the number of pictures to be taken through continuous shooting and the image quality mode setting are read. In step S2, a verification is made as to whether or not the single-shot mode is set, and the operation proceeds to step S3 if the single-shot mode is set, whereas the operation proceeds to step S21 if the continuous shooting mode or the fast continuous shooting mode is set.

Photographing Operation in Single-shot Mode

When the single-shot mode is selected, a battery check level Vth1 for photographing a subject image in the full file size in the fine image quality mode is set in step S3. Since a single subject image is photographed to be recorded in the memory card 5 in the single-shot mode, the photographing operation in the single-shot mode can be executed with less remaining battery power compared with the battery power that would be required in the rapid shooting mode, the continuous shooting mode and the fast continuous shooting mode which are to be explained later and, consequently, Vth1 in the sinqle-shot mode can be set lower than any of the battery check levels set for the other modes. Next, in step S4, the battery voltage Vb is read from the A/D converter 10, and in the following step S5, a verification is made as to whether or not the current battery voltage Vb is equal to or greater than the check level Vth1. If the battery voltage Vb is lower than the check level Vth1 in the single-shot mode, the operation proceeds to step S6 to flash the remaining battery power indicator segment (not shown) at the LCD 6 and to sound the buzzer 20 so that the photographer is prompted to replace the batteries, before returning to step S1.

If the battery voltage Vb is equal to or greater than the single-shot mode check level Vth1, the operation proceeds to step S7 to execute a photographing operation in the single-shot mode. In step S7, a verification is made as to whether or not a shutter release has been effected through the shutter release switch 13 and if a shutter release has been effected, the operation proceeds to step S8 to engage the CCD 1 in an image-capturing operation. After the image-capturing operation, original image data are taken in from the input circuit 2 and are stored in the buffer memory 4 in step S9. In the following step S10, the original image data are read out from the buffer memory 4, and the original image data thus read out are compressed at the compression/decompression circuit 3 in conformance to the current image quality mode setting (fine, normal or basic) and the file size setting (full size or VGA size). The resulting compressed image data are stored in the buffer memory 4 again. In step S11, prior to transferring the compressed image data to the memory card 5, a shutter release interruption is authorized to enable rapid shooting in which a next photographing operation (image-capturing by the CCD) is performed before or during the transfer. The rapid shooting operation enabled through the shutter release interruption is to be detailed later. In step S12, the compressed image data in the buffer memory 4 are transferred and recorded at the memory card 5. The photographing operation in the single-shot mode is completed at this point, and the operation returns to step S1 to stand by for the next photographing operation.

It is to be noted that since the length of time required for the image processing and the image recording and the quantity of power consumption vary depending upon the image quality mode setting and the file size setting in the single-shot mode, the battery check level Vth1 may be varied in correspondence to the image quality mode setting and the file size setting. As explained above, the check level for photographing a single subject image in the full file size in the fine image quality mode is set for the battery check level Vth1 in the single-shot mode in the embodiment. Since the length of time required for the processing and the quantity of power consumption are further reduced when a photographing operation is performed in the normal image quality mode or the basic image quality mode or when a photographing operation is performed at the VGA file size, an even lower check level than the check level Vth1 can be set in correspondence to such an image quality mode setting or file size setting.

Since the battery check level is set in correspondence to the image quality mode setting, i.e., the image data compression rate in this manner, any interruption of a photographing operation can be prevented from occurring due to loss of battery power even when the image data compression rate is low and the volume of compressed image data is large, in which case a large quantity of battery power is required for the image recording processing.

In addition, since the battery check level is set in correspondence to the file size of the image data having undergone the image processing, any interruption of a photographing operation can be prevented from occurring due to loss of battery power even when image data are recorded in the full file size at the recording medium by consuming a large quantity of battery power.

It is to be noted that since the image processing time before the image compressing operation varies according to the file size of the image data, the battery check level may be set in consideration of the file size (the image processing time).

Photographing Operation in Rapid Shooting Mode

Figure 5:
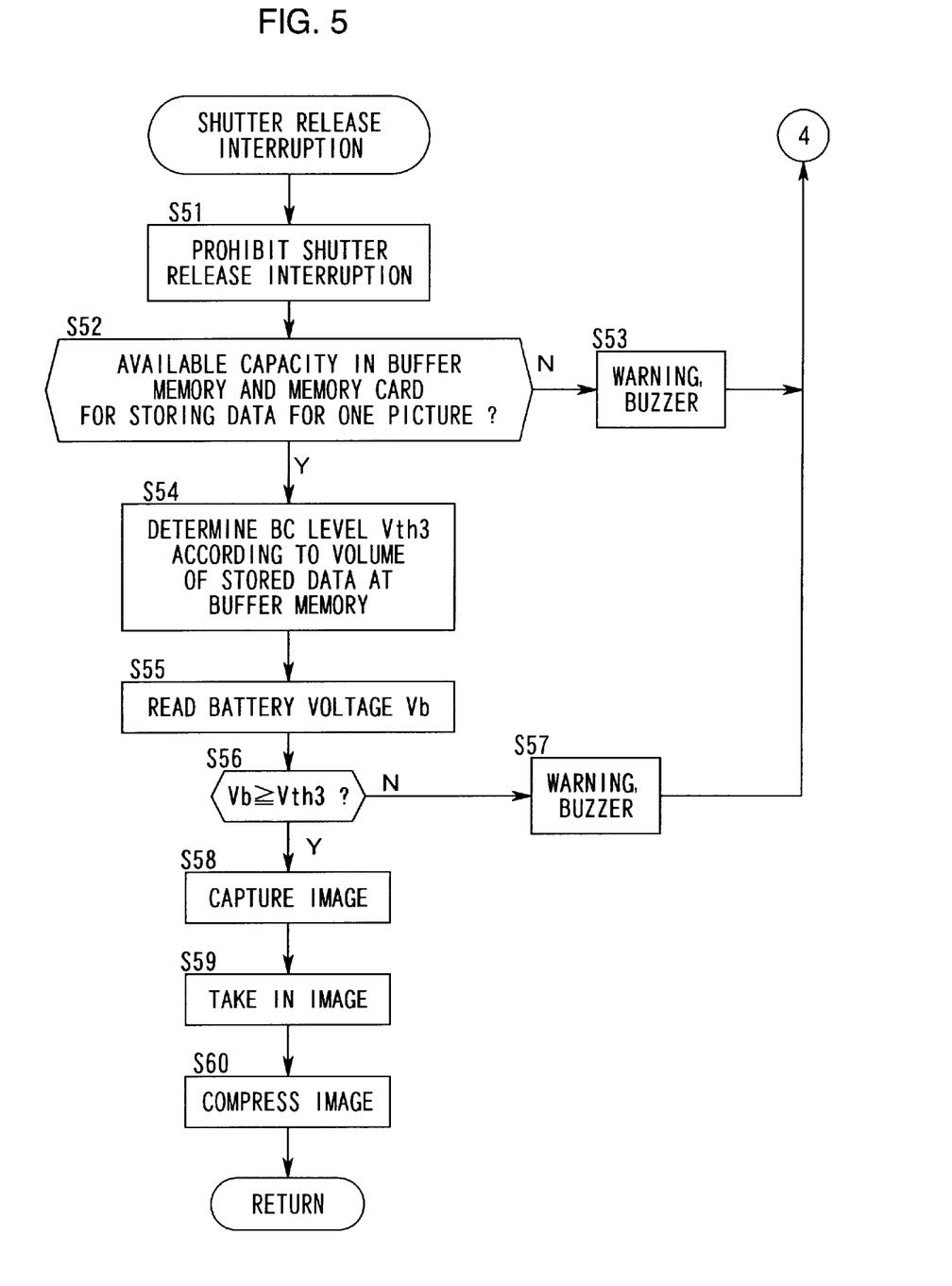
FIG. 5 is a flowchart of the shutter release interruption routine implemented in the embodiment.

Next, in reference to FIG. 5 which presents the shutter release interruption routine, a photographing operation performed in the rapid shooting mode is explained.

As explained earlier, a shutter release interruption is authorized in step S11 after image data obtained through single shot photographing are compressed, and thus, if the shutter release is effected before or during the transfer of the compressed image data to the memory card 5, the transfer operation is interrupted to engage in rapid shooting by executing the shutter release interruption processing in FIG. 5. After prohibiting a shutter release interruption in step S51, the operation proceeds to step S52 to make a verification as to whether or not the buffer memory 4 and the memory card 5 each have available capacity for one picture. If the buffer memory 4 does not have available capacity for storing original image data corresponding to one picture or if the memory card 5 does not have available capacity for recording compressed image data corresponding to one picture, a photographing operation cannot be performed, and thus, the operation proceeds to step S53 to notify the photographer that a photographing operation cannot be performed by issuing a warning at the LCD 6 and sounding the buzzer 20. Then, the operation returns to step S12.

If the buffer memory 4 and the memory card 5 each have available capacity for one picture, the operation proceeds to step S54 in which a battery check level Vth3 for the rapid shooting mode is determined based upon the data volume of the compressed image file stored in the buffer memory 4. Since a photographing operation to take a picture for the next frame is started before the transfer of the compressed image data corresponding to the preceding frame to the memory card 5 is completed in the rapid shooting mode, the compressed image data of the preceding frame or the frames before the preceding frame are still present in the buffer memory 4. These compressed image data must be transferred and recorded into the memory card 5 together with the compressed image data corresponding to the next frame, after the photographing operation for the next frame is performed through rapid shooting. Thus, the battery check level Vth3 for rapid shooting must be determined by taking into consideration the volume of the image data of the preceding frames remaining in the buffer memory 4.

Figure 6:
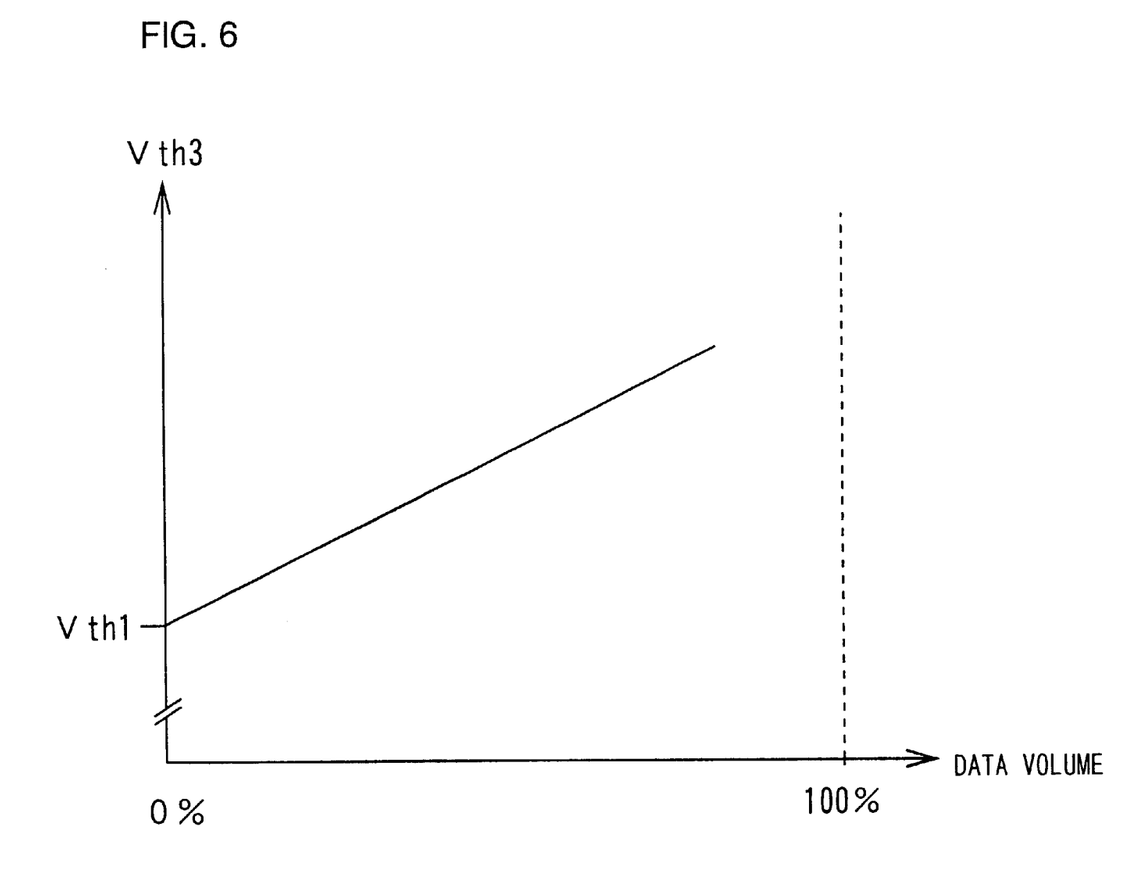
FIG. 6 is a graph of the battery check level Vth3 in the rapid shooting mode relative to the data volume within the buffer memory.

FIG. 6 is a graph of the battery check level Vth3 in the rapid shooting mode relative to the data volume within the buffer memory 4.

When the data volume at the buffer memory 4 is at 0%, the battery check level Vth3 is set to the single-shot mode check level Vth1 since the photographing operation will be performed under the same conditions as those of the single-shot mode. Since a greater length of time is required for data transfer and therefore a greater quantity of power must be consumed as the data volume within the buffer memory 4 increases, the battery check level Vth3 is set higher in correspondence to the increase in data volume to secure a larger quantity of available battery power. It is to be noted that if the data volume within the buffer memory 4 is close to 100%, there is not enough capacity available for storing new original image data obtained through image-capturing and thus, the photographing operation cannot be performed. In addition, the data volume corresponding to a given number of pictures in the buffer memory 4 of the image data varies depending upon the image quality mode setting and the file size setting.

In step S55, the battery voltage Vb is read from the A/D converter 10, and in the following step S56, the current battery voltage Vb is compared with the rapid shooting mode check level Vth3. If the battery voltage Vb is lower than the rapid shooting mode check level Vth3, which is set in correspondence to the data volume in the buffer memory 4, the operation proceeds to step S57 to prompt the photographer to replace the batteries by flashing the remaining battery power indicator segment at the LCD 6 and sounding the buzzer 20, before returning to step S12.

If the battery voltage Vb is equal to or greater than the rapid shooting mode check level Vth3, the operation proceeds to step S58 to execute a photographing operation. Namely, in step S58, the CCD 1 engages in an image-capturing operation, and in the following step S59, the original image data are taken in from the input circuit 2 and stored in the buffer memory 4. Then, in step S60, the original image data are read from the buffer memory 4, the original image data thus read are compressed at the compression/decompression circuit 3 in conformance to the image quality mode setting and the file size setting, and the resulting compressed image data are stored in the buffer memory 4 again. When the rapid shooting operation described above is completed, the operation returns to the program that was being executed when the interruption occurred (step S11 in FIG. 2). In step S12 following the return, the compressed image data corresponding to the preceding frames and the compressed image data corresponding to the frame in which the photographing operation has been performed at this time, stored in the buffer memory 4 are transferred to the memory card 5.

Since the battery check level is set in correspondence to the volume of the image data stored in the buffer memory and the battery voltage detection value is compared with the check level setting to make a decision as to whether or not a photographing operation can be performed for the next frame if a shutter release is effected before the image data transfer from the buffer memory to the memory card is completed in this manner, any interruption of the rapid shooting operation can be prevented from occurring due to low battery to improve the degree of reliability of the rapid shooting operation.

Photographing Operation in Continuous Shooting Mode or Fast Continuous Shooting Mode Next, in reference to FIG. 3, if the continuous shooting mode or the fast continuous shooting mode is set, first in step S21, a verification is made as to whether or not the number of pictures N for continuous shooting has been set in advance. If the number of pictures N for continuous shooting has not been set, the number of pictures N for continuous shooting is set to a maximum number of pictures Nmax whose data can be stored in the buffer memory 4 in correspondence to the image quality mode setting and the file size setting in step S22. It is to be noted that the processing is implemented with the image quality mode set to the normal mode and the file size set to the VGA size if the fast continuous shooting mode is set.

Next, in step S23, a verification is made as to whether or not the buffer memory 4 and the memory card 5 each have available capacity for storing data corresponding to the number of pictures N for continuous shooting. When N pictures are to be shot continuously, the buffer memory 4 must have enough available capacity for storing original image data of one picture and compressed image data corresponding to (N−1) pictures, and the memory card 5 must have enough available capacity for recording compressed image data corresponding to N pictures. It is to be noted that when the continuous shooting mode is set, the available capacities are checked in correspondence to the image quality mode setting and the file size setting, whereas the available capacities are checked by assuming that the normal image quality mode and the VGA file size are set when the fast continuous shooting mode is set. If, at least, either the buffer memory 4 or the memory card 5 does not have sufficient available capacity, the operation proceeds to step S24 to notify that a continuous shooting operation cannot be performed by issuing a warning and sounding the buzzer before returning to step S1.

If the buffer memory 4 and the memory card 5 both have available capacity for storing image data corresponding to N pictures to be taking through continuous shooting, the operation proceeds to step S25 to determine a continuous shooting mode battery check level Vth2 in correspondence to the number of pictures N for continuous shooting, the image quality mode setting and the file size setting. In the continuous shooting mode, first, original image data obtained through image-capturing are taken into and stored in the buffer memory 4, then the original image data are read out from the buffer memory 4 to undergo image processing and compression processing and the resulting compressed image data are stored in the buffer memory 4 again. This sequence of image-capturing operation and image compression operation is repeated for N pictures, and when N pictures have been taken, the compressed image data corresponding to the N pictures in the buffer memory 4 are transferred to the memory card 5. As a result, the continuous shooting mode requires an available battery power quantity that will last from the start of the photographing operation of the first picture until the transfer of the compressed image data of the Nth picture to the memory card is completed. It is to be noted that the processing in step S25 is performed with the image quality mode set to the normal mode and the file size set to the VGA size when the fast continuous shooting mode is set.

Figure 7:
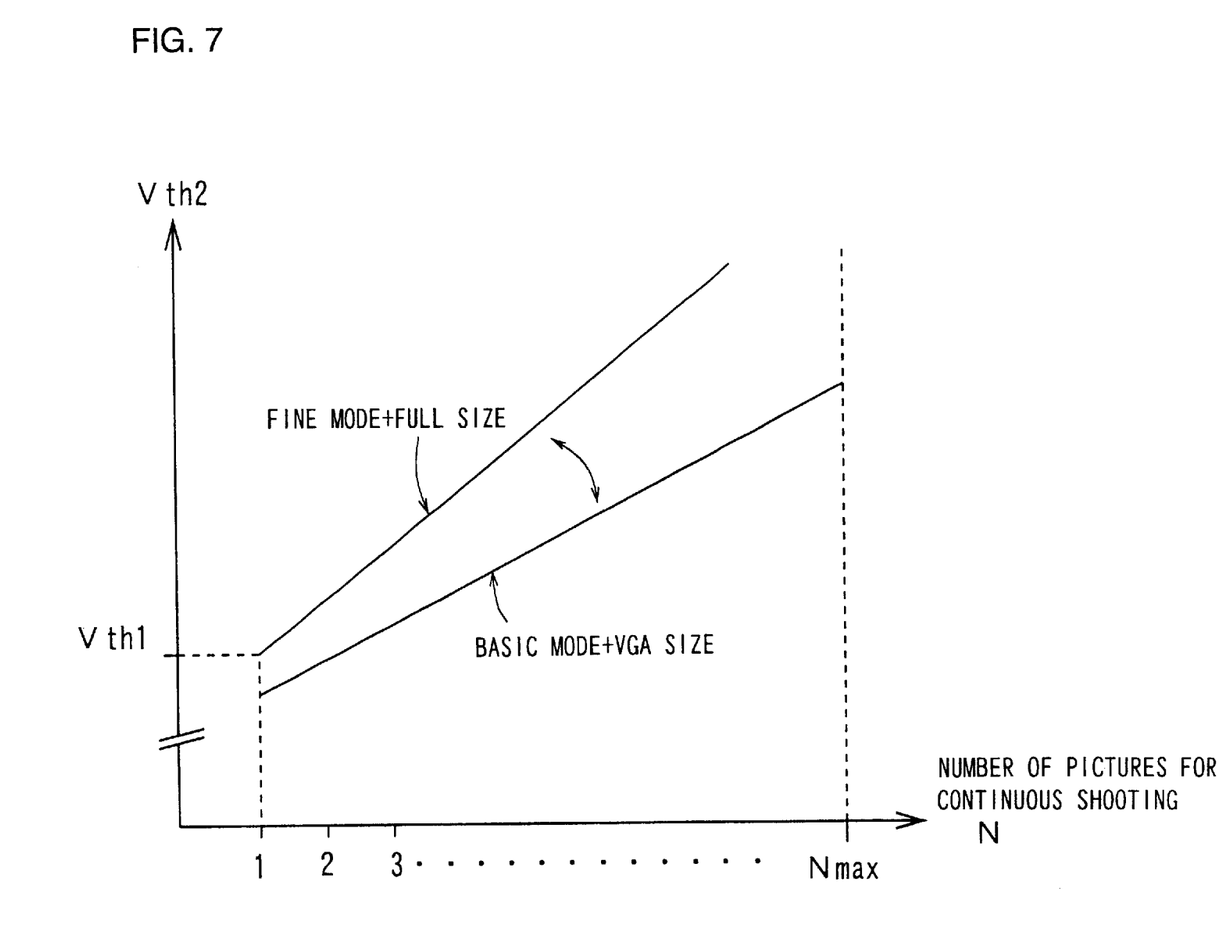
FIG. 7 is a graph of the battery check level Vth2 in the continuous shooting mode relative to the number of pictures N taken continuously with the image quality mode and the file/size used as parameters.

FIG. 7 is a graph of the continuous shooting mode battery check level Vth2 relative to the number of pictures set for continuous shooting, with the image quality mode setting and the file size setting used as parameters.

As the check level is set to Vth1 when a single-shot operation is performed in the fine mode and at the full file size in the embodiment, the check level for continuous shooting of one picture in the fine mode at the full file size is set to Vth1. Since a greater length of time is required for the image processing and the data transfer and, therefore, a greater quantity of power must be consumed as the number of pictures N for continuous shooting increases, the battery check level Vth2 is set higher in correspondence to the increase in the number of pictures N for continuous shooting to secure a greater quantity of available battery power. In addition, since a greater length of time is required for the data transfer and, therefore, a greater quantity of power must be consumed as the compression rate corresponding to the image quality mode becomes low and also as the file size increases, the check level Vth2 is set higher in conformance to the decreases in the compression rate and the increases in the file size. It is to be noted that since a longer time for the image processing before the image data compression operation is required as the file size increases, the check level Vth2 may be set in consideration of the image processing time. As shown in the figure, when the operation is performed in the basic mode with the highest compression rate and at the VGA file size, the image data volume is the smallest and, consequently, the check level Vth2 relative to the number of pictures N for continuous shooting is at the lowest. In contrast, when the operation is performed in the fine mode with the lowest compression rate at the full file size, the image data volume is the largest and, consequently, the check level Vth2 relative to the number of pictures N for continuous shooting is at the highest. Furthermore, the maximum number of pictures that can be obtained through continuous shooting is smaller than Nmax.

In step S26, the battery voltage vb is read from the A/D converter 10, and in the following step S27, the current battery voltage Vb is compared with the continuous shooting mode check level Vth2. If the battery voltage Vb is lower than the continuous shooting mode check level Vth2, the operation proceeds to step S28 to prompt the photographer to replace the batteries by flashing the remaining battery power indicator segment at the LCD 6 and sounding the buzzer 20, before returning to step S1.

If the battery voltage Vb is equal to or greater than the continuous shooting mode check level Vth2, the operation proceeds to step S31 to start a continuous shooting operation. In step S31, a verification is made as to whether or not a shutter release has been effected through the shutter release switch 13, and if an affirmative decision is made, the operation proceeds to step S32. In step S32, a continuous shooting picture number counter n is incremented. In step S33, the CCD 1 engages in an image-capturing operation, and in the following step S34, the original image data are taken in from the input circuit 2 and are stored in the buffer memory 4. Then, in step S35, the original image data are read out from the buffer memory 4 to undergo compression at the compression/decompression circuit 3 in conformance to the image quality mode setting and the file size setting, and the resulting compressed image data are stored in the buffer memory 4 again.

When the image-capturing operation and the image processing for the nth picture are completed, the value at the continuous shooting picture number counter n and the number of pictures N for continuous shooting are compared with each other in step S36 to make a verification as to whether or not the image-capturing operation and the image processing for N pictures have been completed. If the image-capturing operation and the image processing for N pictures have not been completed, the operation returns to step S32 to perform image-capturing and image processing for the next frame. When the image-capturing operation and the image processing for N pictures are completed, the operation proceeds to step S37 to transfer the compressed image data of the N pictures in the buffer memory 4 to the memory card 5. The continuous shooting operation is thus completed and the operation returns to step S1.

Since the battery check level is set in conformance to the setting for the number of pictures for continuous shooting and a decision is made as to whether or not a photographing operation is enabled by comparing the battery voltage detection value with the check level setting in this manner, any interruption of the continuous shooting operation can be prevented from occurring due to low battery power even when a great quantity of battery power is consumed through continuous shooting of many pictures, to improve the degree of reliability of the continuous shooting operation.

In addition, since the battery check level is set by taking into consideration the image quality mode setting, i.e., the image data compression rate, any interruption of the continuous shooting operation can be prevented from occurring due to low battery power even when the continuous shooting operation is performed at a low compression rate, to further improve the degree of reliability of the continuous shooting operation, in addition to the advantage explained above.

Furthermore, since the battery check level is set by taking into consideration the file size after the image processing, any interruption of the continuous shooting operation can be prevented from occurring due to low battery power even when the continuous shooting operation is performed at the full file size to further improve the degree of reliability of the continuous shooting operation, in addition to the advantages explained above.

Variation of the Embodiment

While a continuous shooting operation is performed by setting the number of pictures for continuous shooting in advance in the embodiment described above, now an example of a variation in which a continuous shooting operation is sustained while a shutter release is in effect without setting the number of pictures for continuous shooting in advance is explained. In this variation, the number of pictures N' that can be taken continuously is set based upon the battery voltage Vb detected before continuous shooting and the image quality mode setting and the file size setting, and the number of pictures for continuous shooting is limited so as not to exceed N', to ensure that "low battery power" does not occur during the continuous shooting operation.

Figure 8:
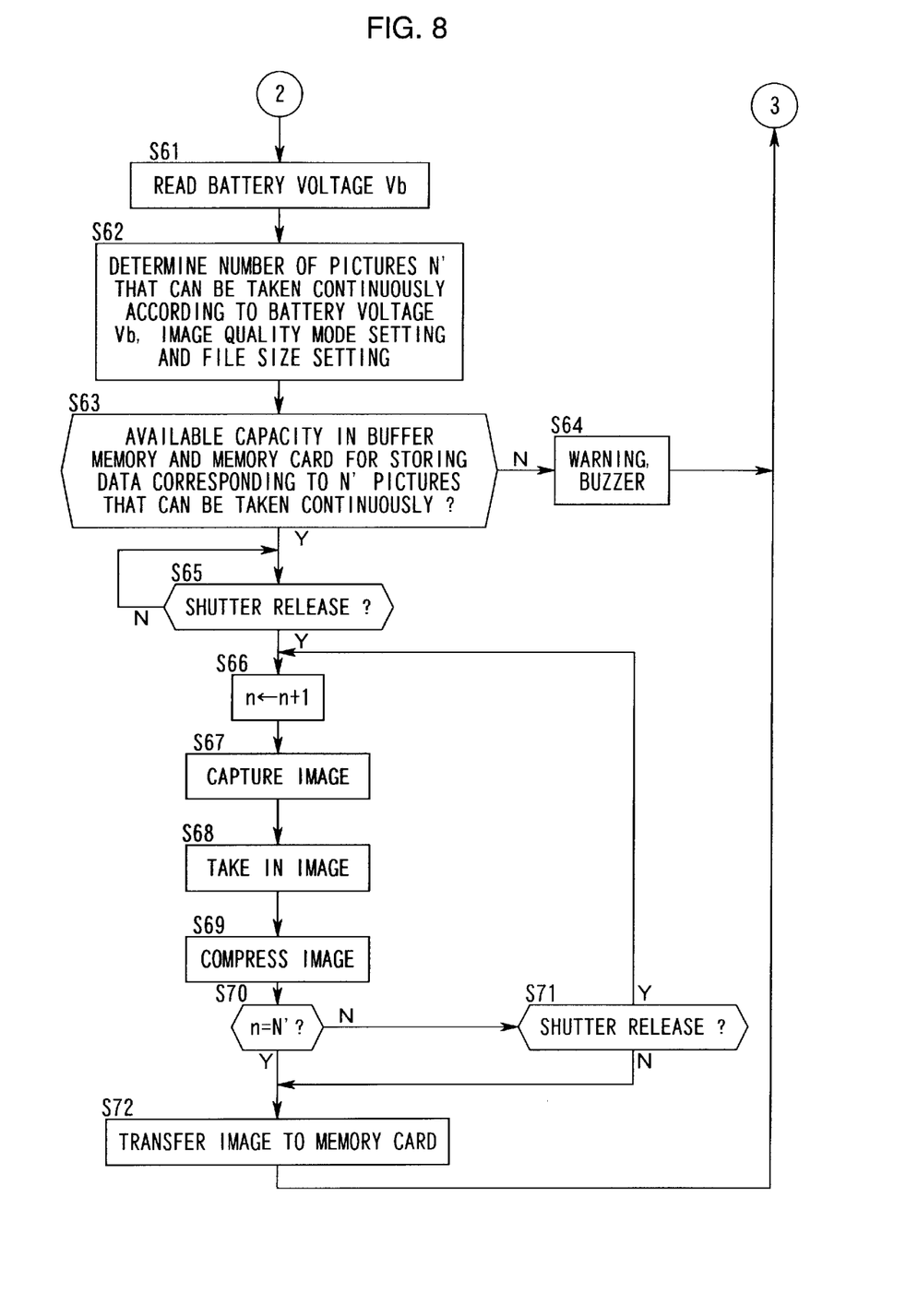
FIG. 8 is a flowchart of the photographing mode control implemented in the continuous shooting mode in a variation.

FIG. 8 is a flowchart of a photographing operation performed in the continuous shooting mode in the variation. The continuous shooting operation in the variation corresponds to the continuous shooting operation in the embodiment shown in FIGS. 3 and 4.

If the continuous shooting mode is set, the battery voltage Vb is read via the A/D converter 10 in step S61. In the following step S62, the number of pictures N' that can be taken continuously is determined based upon the battery voltage Vb, the image quality mode setting and the file size setting. It is to be noted that if the fast continuous shooting mode is set, the number of pictures N' that can be taken continuously is determined in conformance to the battery voltage Vb and by assuming that the normal image quality mode and the VGA file size are set.

Figure 9:
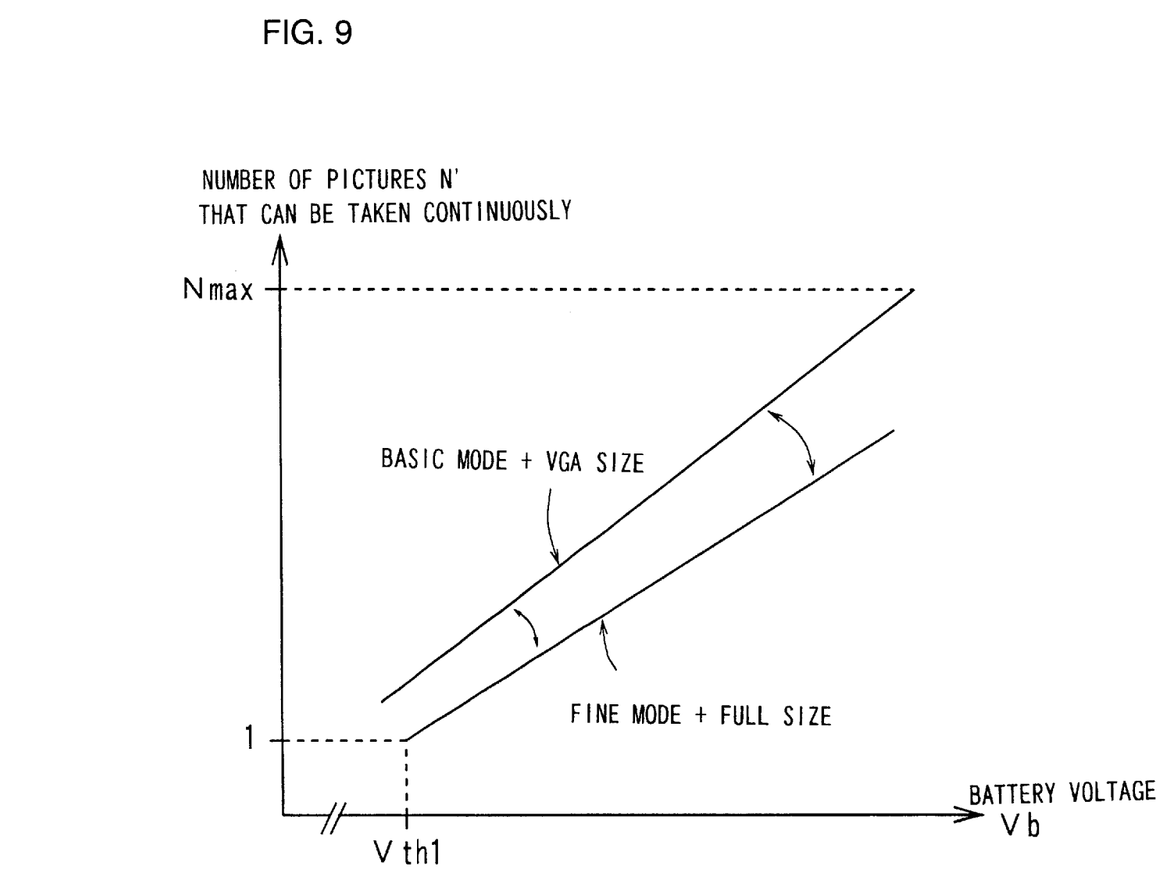
FIG. 9 is a graph of the number of pictures N' that can be taken continuously relative to the battery voltage Vb with the image quality mode and the file size used as parameters.

FIG. 9 is a graph of the number of pictures N' that can be taken continuously relative to the battery voltage Vb with the image quality mode and the file size used as parameters.

Since the check level is set to Vth1 when a single-shot operation is performed in the fine mode and at the full file size in the embodiment, the number of pictures that can be taken continuously in the fine mode at the full file size is at least one as long as the battery voltage Vb is equal to or greater than the single-shot mode check level Vth1. When the battery voltage Vb is higher, a greater quantity of battery power is available and consequently, the number of pictures N' that can be taken continuously is larger. In addition, since a smaller quantity of battery power needs to be consumed per picture as the compression rate corresponding to the image quality mode becomes higher and the file size becomes smaller, the number of pictures N' that can be taken continuously relative to the-battery voltage Vb is the smallest when the operation is performed in the fine mode at the full file size, whereas the number of pictures N' that can be taken continuously relative to the battery voltage Vb is the largest when the operation is performed in the basic mode at the VGA size.

After the number of pictures N' that can be taken continuously is determined in step S63, a verification is made as to whether or not the buffer memory 4 and the memory card 5 each have available capacity for storing data corresponding to N' pictures that can be taken continuously. If the buffer memory 4 does not have available capacity for storing original image data corresponding to one picture and compressed image data corresponding to (N'−1) pictures or if the memory card does not have available capacity for recording compressed image data corresponding to N' pictures, the operation proceeds to step S64 to issue a warning and sound the buzzer before returning to step S1. It is to be noted that if the continuous shooting mode is set, the available capacities are checked in correspondence the image quality mode setting and the file size setting, whereas if the fast continuous shooting mode is set, the available capacities are checked at the normal image quality mode and the VGA file size setting.

If the buffer memory 4 and the memory card 5 both have available capacity for storing data corresponding to N' pictures the operation proceeds to step S65 to make a verification as to whether or not a shutter release has been effected through the shutter release switch 13. If a shutter release has been effected, the operation proceeds to step S66 to increment the continuous shooting picture number counter n. In step S67, the CCD 1 engages in an image-capturing operation, and in the following step S68, the original image data are taken in from the input circuit 2 and are stored in the buffer memory 4. Then, in step S69, the original image data are read out from the buffer memory 4 to undergo compression at the compression/decompression circuit 3 in conformance with the image quality mode setting and the file size setting, and the resulting compressed image data are stored in the buffer memory 4 again.

When the image-capturing operation and the image processing for the nth picture are completed, the value at the continuous shooting picture number counter n is compared with the number of pictures N' that can be taken continuously in step S70, and when the continuous shooting operation over the maximum number of pictures N' that can be taken continuously without causing low battery power is completed, the operation proceeds to step S72, whereas the operation proceeds to step S71 otherwise. If the continuous shooting operation of N' pictures has not been completed, a verification is made in step S71 as to whether or not the shutter release is still in effect. If the shutter release is still in effect, the operation returns to step S66 to engage in the image-capturing operation and the image processing of the next frame. When the image-capturing operation and the image processing for N' pictures that can be taken continuously are completed or if the shutter release is discontinued during the continuous shooting operation, the operation proceeds to step S72 to transfer and record the compressed image data stored in the buffer memory 4 into the memory card 5. Then the operation returns to step S1.

Since the number of pictures that can be taken continuously is determined in correspondence to the battery voltage detection value and the number of pictures to be taken in the continuous shooting mode is limited to the number of pictures that can be taken continuously, any interruption of the continuous shooting operation can be prevented from occurring due to low battery to achieve an improvement in the degree of reliability of the continuous shooting operation.

In addition, since the number of pictures that can be taken continuously is set by taking into consideration the image quality mode setting, i.e., the image data compression rate, any interruption of the continuous shooting operation can be prevented from occurring due to low battery power even when the continuous shooting operation is performed at a low compression rate to further improve the degree of reliability of the continuous shooting operation, in addition to the advantage explained above.

Furthermore, since the number of pictures that can be taken continuously is set by taking into consideration the file size after the image processing, any interruption of the continuous shooting operation can be prevented from occurring due to low battery power even when the continuous shooting operation is performed at the full file size, to further improve the degree of reliability of the continuous shooting operation, in addition to the advantages explained above.

It is to be noted that while the present invention is adopted in an electronic still camera in the explanation given in reference to the embodiment, it is not limited to application in the electronic still cameras described above and may also be adopted in a portable personal computer or the like to which a CCD camera or the like can be connected or which is internally provided with a CCD camera or the like. It may also be adopted in a video camera having a still picture photographing function. In other words, the present invention may be adopted in all types of battery-driven image processing apparatuses that capture an image of a subject and record the still image data in a non-volatile recording medium such as a flash memory or a hard disk. In this specification, the "electronic still camera" is a term that is used to generically refer to such image processing apparatuses as well.

In addition, the control program executed by the controller 11 is installed in a ROM or the like during the process of manufacturing the electronic camera in the embodiment under normal circumstances. However, the ROM in which the control program is installed may be a rewritable ROM so that by connecting the electronic still camera to a computer or the like (not shown), an upgrade program can be obtained from a recording medium such as a CD ROM via the computer. In this case, the control program executed by the controller 11 is recorded in a recording medium such as a CD ROM. In addition, an upgrade program can be obtained via the internet or the like in a similar manner. In such a case, the control program executed by the controller 11 is provided in the form of a data signal on a carrier wave transmitted on a communication line.

In a personal computer that is internally or otherwise provided with the CCD camera described above, the program according to the present invention is provided via the CD ROM drive device, the Internet connection function or the like of the personal computer.

What is claimed is:

1. An electronic camera comprising:

an image-capturing element that captures an image of a subject and outputs image data;

a photography mode selection device that selects a photography mode among a plurality of photography modes;

a recording device that records the image data output by the image-capturing element into a recording medium;

a battery voltage detection device that detects a battery voltage;

a check level setting device that sets a battery check level according to the selected photography mode; and a photographing decision-making device that makes a decision as to whether or not a photographing operation is enabled by comparing the battery voltage value detected by said battery voltage detection device with the check level set by said check level setting device.

2. An electronic camera according to claim 1, further comprising:

a warning device that stops a photographing operation for a current frame and issues a warning when said photographing decision-making device decides that the photographing operation is not possible.

3. An electronic camera according to claim 1, wherein:

the plurality of photography modes include a single-shot mode and a continuous shooting mode.

4. An electronic camera according to claim 3, wherein the plurality of photography modes include a single-shot mode, a continuous shooting mode, a fine image quality mode, a normal image quality mode and a basic image quality mode.

5. An electronic camera according to claim 1, wherein:

the plurality of photography modes include image quality modes.

6. An electronic camera according to claim 5, wherein the image quality modes comprise a fine mode, a normal mode and a basic mode.

7. An electronic camera comprising:

an image-capturing element that captures an image of a subject and outputs image data;

a compression rate selecting device that selects a compression rate among a plurality of compression rates;

a compression control device that compresses the image data output by the image-capturing element according to the selected compression rate;

a recording device that records the compressed image data into a recording medium;

a battery voltage detection device that detects a battery voltage;

a check level setting device that sets a battery check level according to the selected compression rate; and a photographing decision-making device that makes a decision as to whether or not a photographing operation is enabled by comparing the battery voltage value detected by said battery voltage detection device with the check level set by said check level setting device.

8. An electronic camera according to claim 7, further comprising:
a warning device that stops a photographing operation for a current frame and issues a warning when said photographing decision-making device decides that the photographing operation is not possible.

9. An electronic camera comprising:
a file generation device that processes image data output by an image-capturing element, which captures an image of a subject, the file generation device generating a file having a variable size depending on an image data processing process, and records the file thus generated into a recording medium;
a battery voltage detection device that detects a battery voltage;
a check level setting device that sets a battery check level according to a size of a file generated by said file generation device; and
a photographing decision-making device that makes a decision as to whether or not a photographing operation is enabled by comparing the battery voltage value detected by said battery voltage detection device with the check level set by said check level setting device.

10. An electronic camera according to claim 9, further comprising:
a warning device that stops a photographing operation for a current frame and issues a warning when said photographing decision-making device decides that the photographing operation is not possible.

11. An electronic camera according to claim 9, wherein the image data processing processes the image data based on at least one of a selected file size and a selected image quality mode.

12. An electronic camera comprising:
a recording device that records image data output by an image-capturing element, which captures an image of a subject, into a recording medium;
a continuous shooting picture number setting device that sets a number of pictures to be taken in a continuous shooting mode
a battery voltage detection device that detects a battery voltage;
a check level setting device that sets a battery check level according to a number of pictures for continuous shooting set by said continuous shooting picture number setting device; and
a photographing decision-making device that makes a decision as to whether or not a photographing operation is enabled by comparing the battery voltage value detected by said battery voltage detection device with the check level set by said check level setting device.

13. An electronic camera according to claim 12, further comprising:
a warning device that stops a photographing operation for a current frame and issues a warning when said photographing decision-making device decides that the photographing operation is not possible.

14. An electronic camera according to claim 12, wherein:
said recording device records the image data in the recording medium after compressing the image data at a specific compression rate; and
said check level setting device sets the battery check level by taking into consideration the specific compression rate.

15. An electronic camera according to claim 12, wherein:
said recording device processes the image data, generates a file having a size depending on an image data processing and records the file thus generated into the recording medium; and
said check level setting device sets the battery check level by taking into consideration a size of a file generated by said recording device.

16. An electronic camera comprising:
a recording device that records image data output by an image-capturing element, which captures an image of a subject, into a recording medium;
a battery voltage detection device that detects a battery voltage;
a continuous shooting enabled picture number determining device that determines a number of pictures that can be taken continuously according to the battery voltage detected by said battery voltage detection device; and
a continuous shooting picture number limiting device that limits a number of pictures to be taken in a continuous shooting mode to said number of pictures that can be taken continuously.

17. An electronic camera according to claim 16, wherein:
said recording device records the image data in the recording medium after compressing the image data at a specific compression rate; and
said continuous shooting enabled picture number determining device determines the number of pictures that can be taken continuously by taking into consideration the specific compression rate.

18. An electronic camera according to claim 16, wherein:
said recording device processes the image data, generates a file having a size depending on an image data processing and records the file thus generated into the recording medium; and
said continuous shooting enabled picture number determining device determines the number of pictures that can be taken continuously by taking into consideration a size of a file generated by said recording device.

19. An electronic camera comprising:
a storage element that is capable of storing image data corresponding to a plurality of frames output by an image-capturing element which captures an image of a subject;
a recording device that transfers and records the image data stored at said storage element into a recording medium;
a battery voltage detection device that detects a battery voltage;
a check level setting device that sets a battery check level according to a volume of image data stored at said storage element which have not been transferred yet; and
a photographing decision-making device that makes a decision as to whether or not a photographing operation for a next frame is enabled by comparing the battery voltage value detected by said battery voltage detection device with the check level set by said check level setting device when an instruction to start the photographing operation of the next frame is issued before transfer of the image data from said storage element to the recording medium is completed.

20. An electronic camera according to claim 19, further comprising:
a warning device that stops a photographing operation for a current frame and issues a warning when said photographing decision-making device decides that the photographing operation is not possible.

* * * * *